United States Patent
Cheung et al.

(10) Patent No.: US 6,891,377 B2
(45) Date of Patent: May 10, 2005

(54) CONDUCTIVE PAD AROUND ELECTRODES FOR INVESTIGATING THE WALL OF A BOREHOLE IN A GEOLOGICAL FORMATION

(75) Inventors: Philip Cheung, Montesson (FR); Andrew Hayman, Voisins-le-Bretonneux (FR); Dennis Pittman, Lawrenceville, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/240,639
(22) PCT Filed: Mar. 29, 2001
(86) PCT No.: PCT/EP01/03718
§ 371 (c)(1), (2), (4) Date: Mar. 4, 2003
(87) PCT Pub. No.: WO01/77711
PCT Pub. Date: Oct. 18, 2001

(65) Prior Publication Data
US 2003/0164705 A1 Sep. 4, 2003

(51) Int. Cl.⁷ ................................................. G01V 3/18
(52) U.S. Cl. ........................................ 324/374; 324/367
(58) Field of Search ................................ 324/366, 347, 324/355, 367, 373, 374, 375; 702/7, 11

(56) References Cited

U.S. PATENT DOCUMENTS

| | | | | | |
|---|---|---|---|---|---|
| 3,462,678 | A | * | 8/1969 | Eaton | 324/367 |
| 4,236,113 | A | * | 11/1980 | Wiley | 324/366 |
| 4,677,385 | A | * | 6/1987 | Chapman et al. | 324/366 |
| 4,692,707 | A | * | 9/1987 | Locke et al. | 324/374 |

* cited by examiner

Primary Examiner—Jay Patidar
(74) Attorney, Agent, or Firm—J. L. Jennie Salazar; Brigitte L. Echols

(57) ABSTRACT

The present invention relates to apparatus for a tool for investigating the wall of a borehole in a geological formation, the apparatus comprising: a non-conductive pad having an inside face and an outside face for pressing against the wall; a set of measurement electrodes mounted on the outside face of the pad and means for measuring the potential difference between two measurement electrodes; and both a source electrode adapted to inject current into the geological formation and a return electrode, the set of measurement electrodes being situated between the source electrode and the return electrode for the current; the apparatus being characterized in that the pad comprises an electrically conductive portion covering the entire measurement electrode zone and electrically insulated from the measurement electrodes.

10 Claims, 3 Drawing Sheets

CONDUCTIVE PAD AROUND ELECTRODES FOR INVESTIGATING THE WALL OF A BOREHOLE IN A GEOLOGICAL FORMATION

TECHNICAL FIELD OF THE INVENTION

The present invention relates in general terms to electrically exploring a borehole passing through formations in the ground, and more precisely it relates to a logging sonde that enables data which has been acquired by high resolution investigation of the wall of a borehole to be put into the form of images.

BACKGROUND OF THE INVENTION

In general terms, in order to explore hydrocarbon deposits, it is highly desirable to obtain accurate knowledge of the characteristics of the geological formation at various depths of the borehole. Many of these characteristics are very fine in structure, e.g. stratifications, non-uniform elements, pore characteristics, breaks, etc. By way of example, the orientations, the density, and the lengths of breaks play a major role in the dynamic characteristics of a reservoir rock.

For many years, it has been possible to determine such fine characteristics only by analyzing drill cores taken when drilling the borehole. However the taking of such cores is a technique that is extremely expensive, and use thereof remains relatively exceptional.

Patent EP-0 110 750, or corresponding U.S. Pat. No. 4,567,759, describes a technique of producing an image of the wall of a borehole which consists in generating characteristic signals at regular time intervals representative of a measurement with high spatial resolution of some characteristic of the wall, measuring the depth of the hole to which the characteristic signals relate with accuracy of the same order as the spatial resolution of the characteristic signals, and converting the signals representing the characteristic as a linear function of borehole depth with a color scale being associated with the values of the converted signals in order to form a visual image.

That imaging technique is implemented more particularly with a tool for investigating the conductivity of the formation, as described for example in patent EP-0 071 540, or its corresponding U.S. Pat. No. 4,468,623, that is capable of detecting characteristics with millimeter resolution. That type of tool has a series of control electrodes, also known as "buttons", placed on a conductive pad pressed against the wall of the borehole. A constant current source applies voltage to each button and the conductive surface of the pad so that measurement currents are injected into the formation perpendicularly to the wall. A return is provided for the current by means of an electrode situated close to the surface, or possibly on another part of the tool. The pad is moved along the borehole and the discrete currents associated with each button are proportional to the conductivity of the material facing the buttons.

In application of the teaching of patent U.S. Pat. No. 4,567,759, the signals are modified by eliminating effects such as variations in the speed of the tool and disturbances due to variations in the environment of the tool as amplified and displayed in a manner which comes close to providing a visual image of the inside of the hole.

That imaging technique has been highly successful over the last few years when used in boreholes drilled with conductive drilling mud such as water-base mud or mud of the oil-in-water emulsion type. However, with muds having a continuous non-conductive phase, such as oil-base muds or water-in-oil emulsion type muds, the images obtained are of very poor quality. These poor results are generally attributed to interference due to the presence of a layer of non-conductive mud, or of a layer of mud and a mud cake, interposed between the buttons and the formation under test. Since the thickness of the layer of mud varies in particular as a function of the roughness of the wall, the variations in the resulting currents can completely mask any current variations due to the formation being measured.

A novel technique for imaging a borehole drilled with a non-conductive drilling mud is described in international patent application PCT/US99/14420. That tool for investigating formation conductivity differs from the tool known from patent U.S. Pat. No. 4,468,623 in that it uses a non-conductive pad and buttons that form voltage electrodes instead of current electrodes. The current injection electrodes are situated off the pad, or in a preferred variant, directly at the ends thereof. In any event, the two-injectors are placed in such a manner that current passes through the formation substantially parallel to the pad and thus preferably flows substantially orthogonally to the boundaries of the strata. Under such conditions, the potential difference between two buttons is proportional to the resistivity of the material facing the buttons.

The above-specified international patent application recommends using DC, or AC at very low frequency, such that the resistivity of the pad is much greater than the resistivity of the drilling mud. However, in practice, working with DC gives rise to problems of noise due in particular to the formation of spontaneous potentials in the formation. In addition, the quantity of current injected is limited by the resistance of the mud; the potential differences measured between two pairs of buttons are thus very small and therefore difficult to measure.

It would therefore be desirable for it to be possible to work with AC at a relatively high frequency, e.g. of the order of a few thousand hertz. Unfortunately, at such frequencies, the pad behaves like a dielectric and the effective conductivity of the mud also increases. This gives rise to an electrical impedance through the pad that is of the same order as the impedance through the layer of mud. Under such conditions, the potential differences between pairs of buttons are more representative of the potential difference applied between the current electrodes than they are of the resistivity of the formation facing them, and as a result the tool becomes unusable.

SUMMARY OF THE INVENTION

The present invention relates to an apparatus for a tool for investigating the wall of a borehole in a geological formation. The apparatus is provided with a non-conductive pad having an inside face and an outside face for pressing against the wall, a set of measurement electrodes mounted on the outside face of the pad and means for measuring the potential difference between two measurement electrodes and both a source electrode adapted to inject current into the geological formation and a return electrode. The set of measurement electrodes are situated between the source electrode and the return electrode for the current. The pad has an electrically conductive portion covering the entire measurement electrode zone and electrically insulated from the measurement electrodes. The conductive portion of the pad is placed at the electrical potential of the geological formation (is grounded). The grounding may be obtained by electrically connecting the conductive proton of the pad to the body of the investigation tool. The grounding may also be obtained by maintaining the conductive portion of the pad at a potential equal to the mean of the potentials measured by the measurement electrodes. The grounding may also be obtained by maintaining the conductive portion of the pad at a potential equal to the potential measured in the geological formation between the source electrode and the return electrode.

An object of the present invention is to improve the technique of imaging a borehole drilled with a non-conductive drilling mud as described in international patent application PCT/US99/14420 to make it possible to work with AC at frequencies higher than 1000 Hz.

Thus, the invention provides an apparatus for a tool for investigating the wall of a borehole in a geological formation, the apparatus comprising: a non-conductive pad having an inside face and an outside face for pressing against the wall; a set of measurement electrodes mounted on the outside face of the pad and means for measuring the potential difference between two measurement electrodes; and both a source electrode adapted to inject current into the geological formation and a return electrode, the set of measurement electrodes being situated between the source electrode and the return electrode for the current; the apparatus being characterized in that the pad comprises an electrically conductive portion covering the entire measurement electrode zone and electrically insulated from the measurement electrodes.

For good coverage, the conductive portion must extend well beyond the zone having measurement electrodes, with the minimum length increasing with decreasing thickness of the conductive layer and increasing distance of the conductive layer from the measurement electrodes. By using a metal plate at a distance of centimeter order, good results have been obtained with a plate that covers about ten times the length of the measurement electrode zone. When the injectors are situated on the pad, the conductive layer preferably extends over the entire zone between the injectors.

The conductive portion can also be constituted by a metal plate serving as a support for the non-conductive pad which is itself made out of an electrically insulating plastics material, for example. Under such circumstances, the conductive portion of the pad can also cover the side edges of the pad. The conductive portion of the pad can also be an integral portion of the shielding of the electronic circuit for processing the signals coming from the measurement electrodes.

Advantageously, the metal plate can also have electrically conductive appendices extending over all or part of the thickness of the insulative pad so as to define separate sections respectively for the source electrode, the measurement electrodes, and the return electrode. Such a disposition makes it possible to move the injectors closer together and thus reduce the total length of the pad.

In a particularly preferred variant of the invention, the electrically conductive portion of the pad is connected to ground, or more precisely it is placed at the same electrical potential as the geological formation. Under such conditions, the measurement electrodes do indeed measure the potential of the formation facing them even when the pad is inclined, i.e. when the "standoff" distance between the formation and the source electrodes is different from the standoff distance between the formation and the return electrode.

BRIEF DESCRIPTION OF THE DRAWINGS

Other details and advantageous characteristics of the invention appear from the following description given with reference to the accompanying drawings, in which.

DETAILED DESCRIPTION AND PREFERRED EMBODIMENTS

Figure 1:
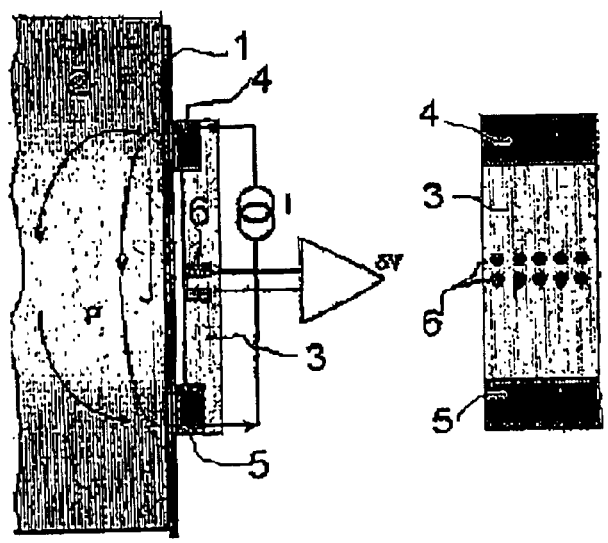
FIG. 1 is a diagram showing the principle on which micro-electrical measurement of the formation is based.

FIG. 1 is a diagram showing the principle on which electrical measurement is based in the imaging technique described in international patent application PCT/US99/14420. That tool is particularly adapted to investigating the wall 2 of a borehole drilled with a non-conductive drilling mud, for example a drilling fluid whose liquid phase is constituted essentially by an oil (diesel oil, synthetic oil) or by a water-in-oil emulsion. The term "oil-base mud" is used below to designate drilling fluids of either of those types. The drilling mud forms a mud cake 1 along the wall 2.

The tool for investigating the wall of a borehole has a pad 3 made of an electrically insulative material such as a ceramic or polymers having high strength and high thermal and chemical stability, in particular of the polyarylene ether cetone type (polyether ether cetone or PEEK).

The pad serves as a support for two current injectors: the source electrode 4 and the return electrode 5. These two electrodes are situated at opposite ends of the pad and occupy the entire width thereof, as can be seen more clearly in the front view of the pad, or at least they occupy a large fraction of its width, so as to maximize the surface areas of these current injection electrodes. The central portion of the pad has two rows of measurement electrodes 6, and in the case shown it has five pairs of measurement electrodes. The shape of the pad is such that the measurement electrodes 6 are set back slightly so that the measurement electrodes do not come directly into contact with the geological formation when the/pad is pressed against the wall 2. It should be observed that this preferred shape is not essential when the rock is porous since under such circumstances, drilling with an oil-base mud causes a mud cake to be formed of resistivity that is greater than that of the geological formation, with this cake always being interposed between the measurement electrodes and the geological formation, thus preventing any of the measurement buttons being short circuited by coming into contact with the rock.

With DC or AC at a frequency of less than about 100 kHz, the resistivity of geological formations generally lies in the range 0.1 $\Omega$m to 10,000 $\Omega$m, whereas an oil-base mud has effective resistivity of about 0.1 M$\Omega$m to about 10 M$\Omega$m. Under such conditions, when a current I is injected into the formation by the injectors 4 and 5, with the measurement electrodes being insulated by the non-conductive pad, then in application of Ohms' law it is observed that the resistivity $\rho$ of the formation situated beneath a pair of measurement electrodes is equal to the ratio of the potential difference $\delta V$ between the two electrodes over the current density J. In other words, the resistivity of the formation is obtained from the equation $\rho=\delta V/J=k.\delta V/i$ where k is a geometrical factor.

If the injected current is AC at a sufficiently high frequency (greater than about 1 kHz), the pad can no longer be considered as being a perfect electrical insulator, but must on the contrary be considered as being a dielectric immersed in a dielectric medium, namely the oil-base mud. With current at a frequency of about 10 kHz, for example, it suffices for the relative permittivity of the pad to be greater than 2 to ensure that the impedance across the pad is of the same order of magnitude as the impedance through the mud. The relative permittivity of polymers of the polyarylene ether cetone above type is of the order of 3 which, compared with other common materials, is a small value. Changing the material is thus no solution.

Figure 2:
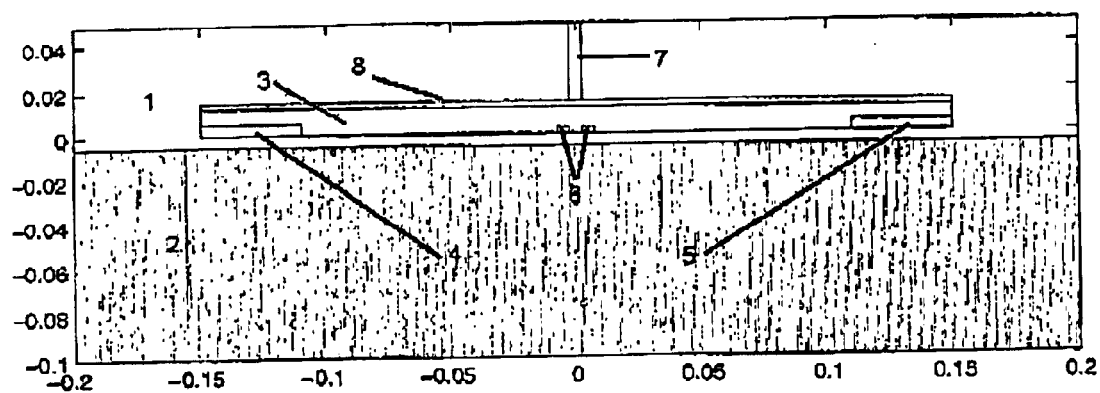
FIG. 2 shows the geometrical model used for simulating the electric fields in the geological formation.

To gain a better understanding of the effect of this dielectric behavior, the pad in contact with the formation has been modelled. The model used is shown in FIG. 2. It consists in mud having a thickness of 5 mm deposited on a rock that is 1 m thick and 2 m long. The pad placed in the central portion of the model is itself modelled in the form of a rectangular body that is 300 mm long and 12.5 mm thick, with current injectors that are 40 mm long and 5 mm thick, and a pair of measurement electrodes, each being 5 mm long and 2.5 mm thick. The pad is connected to the remainder of the tool by a metal arm 7. This model ignores in particular the bundle of electric wires connecting the pad to the electronics unit for processing the signals.

The pad can also be provided with a conductive backplate 8 made of metal, having potential that is "floating" or identical to that of the rock (grounded).

For current at 10 kHz, the conductivities of the materials in question are as follows:

|  | Conductivity ($\sigma + j\omega\epsilon$ Sm$^{-1}$) | | |
| --- | --- | --- | --- |
|  | Real | Imaginary | $\epsilon_r$ |
| Mud | $1 \times 10^{-6}$ | $2.8 \times 10^{-6}$ | 5 |
| Pad (PEEK) | 0 | $1.8 \times 10^{-6}$ | 3.2 |
| Rock (order of magnitude) | $10 - 0.0001$ | $\approx 2 \times 10^{-6}$ | $\approx 3 - 15$ |
| Metal parts | $1 \times 10^6$ | 0 | — |

The oil-base mud under consideration is an emulsion of water-in-oil in a ratio of 10:90, the oil being a synthetic oil of the n-olefin type.

Figure 3A:
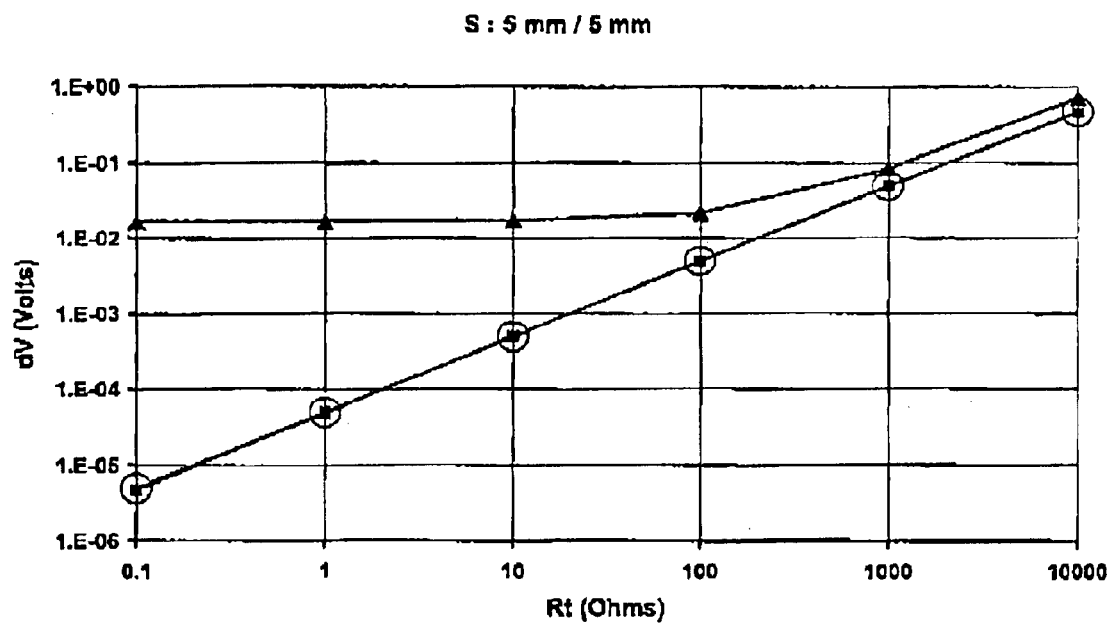
FIG. 3 comprises two graphs (FIGS. 3A and 3B) in which the values calculated as a function of the FIG. 2 model for potential difference between the measurement electrodes are plotted for a pad that is parallel to the wall (FIG. 3A) or that is slightly inclined relative thereto (FIG. 3B)
Figure 3B:
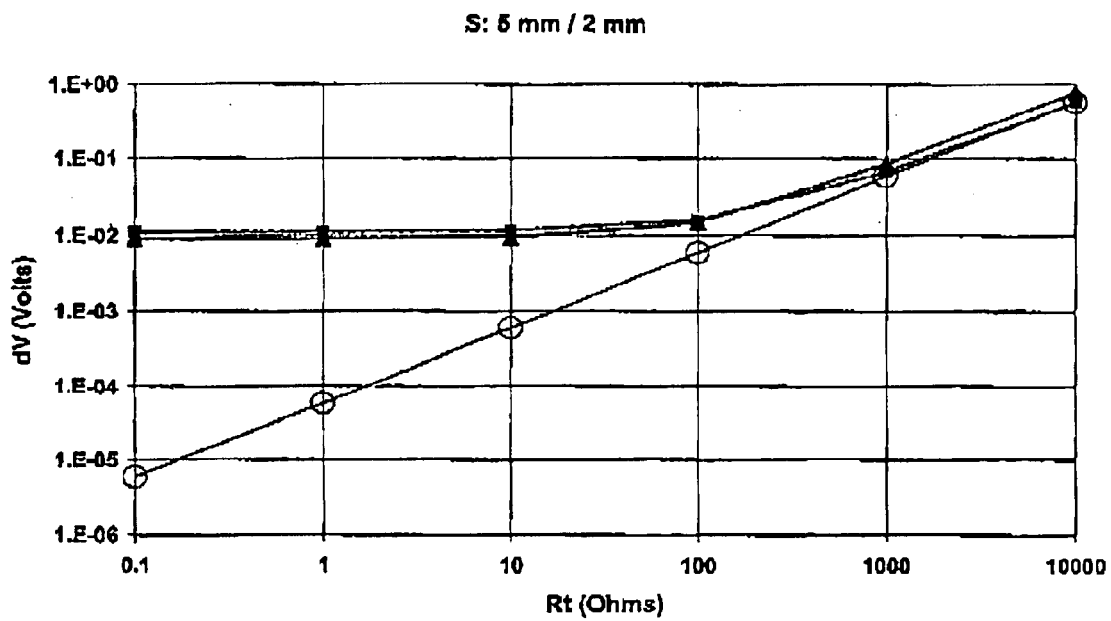

The values calculated from this model for the potential difference between the two measurement electrodes as a function of the resistivity Rt of the rock are plotted in FIG. 3 on the assumption that the pad is exactly parallel to the rock, and is at a uniform. "standoff" distance of 5 mm therefrom (FIG. 3A) and on the assumption that the pad is slightly inclined, with the standoff distance between the pad and the rock varying over the range 2 mm to 5 mm (FIG. 3B).

In the absence of a backplate (values represented by triangles), the signal is practically constant so long as the resistivity of the formation is less than about 100 Ωm, so the tool is unusable if the frequency of the AC at the injectors is 10 kHz.

With a backplate at a potential that is left floating (values represented by squares), the potential difference between the measurement electrodes has the appearance of being directly proportion to the resistance of the rock when the pad is parallel to the rock. However, when the pad is tilted relative to the rock, then, as in the case of a pad without a backplate, the signal is practically constant for formations having a resistivity of less than 100 Ωm. With a backplate connected to ground (i.e. a backplate whose potential is identical to that of the rock), corresponding to the points represented by circles, the signal is indeed characteristic of the resistivity of the formation, even if the pad is slightly tilted, as often occurs in a borehole.

Various means can thus be used to ground the back-plate. By way of example, the simplest way is to connect the plate to the logging tool which is itself connected to ground via the length of cable from which it is suspended, which cable might pass through several thousands of meters of formation.

Another solution is to estimate the potential of the formation by averaging using an electronic circuit that averages the potential values measured by all of the pairs of measurement electrodes.

It is also possible to measure this potential directly, e.g. by means of additional electrodes, electrodes which are preferably quite large, surrounding the set of pairs of measurement electrodes, and then maintaining the backplate at said potential by means of an appropriate electronic circuit.

Figure 4:
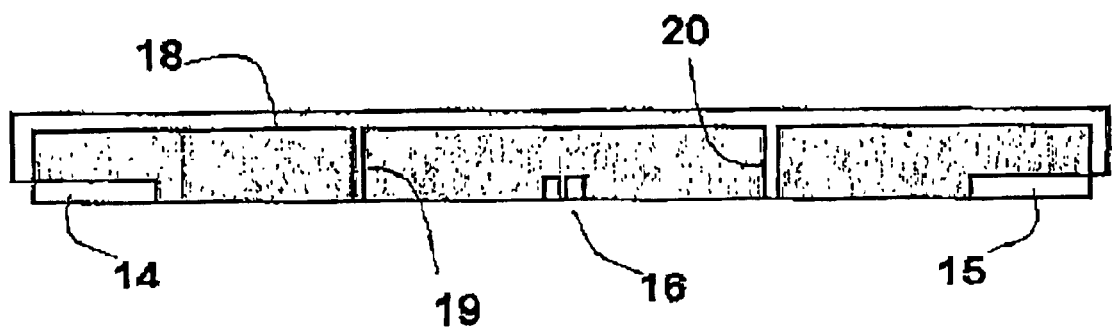
FIG. 4 shows a variant of the invention with a conductive plate subdividing the pad into compartments.

In a particularly preferred variant of the invention, shown diagrammatically in FIG. 4, the conductive backplate 18 has appendices 19, 20 which electrically isolate the measurement electrode 16 zone from the end zones containing the injectors 14,15. With such a design, the minimum distance between the two injectors can be reduced by about 20% while maintaining a signal that is proportional to the resistivity of the geological formation.

What is claimed is:

1. Apparatus for investigating the wall of a borehole in a geological formation, the apparatus comprising:
   a) a non-conductive pad having an inside face and an outside face for pressing against the wall;
   b) a set of measurement electrodes mounted on the outside face of the pad and means for measuring the potential difference between two measurement electrodes; and
   c) both a source electrode adapted to inject current into the geological formation and a return electrode, the set of measurement electrodes being situated between the source electrode and the return electrode for the current;
   wherein the pad comprises an electrically conductive portion covering the entire measurement electrode zone, said electrically conductive portion being electrically insulated from the measurement electrodes and placed at the electrical potential of the geological formation (is grounded).

2. Apparatus according to claim 1, wherein the current source electrode and the current return electrode are situated on the pad.

3. Apparatus according to claim 2, wherein said electrically conductive portion extends over the entire length of the pad between the current source electrode and the current return electrode.

4. Apparatus according to claim 2, wherein the pad is compartmented, the pad comprising a first end section carrying the source electrode, a middle section for the measurement electrodes, and a second end section for the return electrode, said sections being at least partially separated from one another by electrically conductive partitions.

5. Apparatus according to claim 2, wherein the pad is compartmented, the pad comprising a first end section carrying the source electrode, a middle section for the measurement electrodes, and a second end section for the return electrode, said sections being at least partially separated from one another by electrically conductive partitions.

6. Apparatus according to claim 1, wherein said conductive portion is constituted by the metal support of the pad.

7. Apparatus according to claim 1, in which the pad further includes an electronic circuit for processing signals coming from the measurement electrodes, wherein said conductive portion forms an integral portion of the shielding of the electronic circuit.

8. Apparatus according to claim 1, wherein grounding is obtained by electrically connecting said conductive proton of the pad to the body of the investigation tool.

9. Apparatus according to claim 1, wherein the rounding is obtained by maintaining the conductive portion of the pad at a potential equal to the mean of the potentials measured by the measurement electrodes.

10. Apparatus according to claim 1, wherein the grounding is obtained by maintaining the conductive portion of the pad at a potential equal to the potential measured in the geological formation between the source electrode and the return electrode.

* * * * *